United States Patent [19]
Nozawa

[11] Patent Number: 5,311,361
[45] Date of Patent: May 10, 1994

[54] SMALL THREE-UNIT ZOOM LENS

[75] Inventor: Toshihide Nozawa, Tokyo, Japan

[73] Assignee: Olympus Optical Co., Ltd., Tokyo, Japan

[21] Appl. No.: 939,170

[22] Filed: Sep. 2, 1992

[30] Foreign Application Priority Data

Sep. 2, 1991 [JP] Japan .................................. 3-221700

[51] Int. Cl.$^5$ .................................................. G02B 9/14
[52] U.S. Cl. ...................................... 359/690; 359/687
[58] Field of Search ................................ 359/687, 690

[56] References Cited

U.S. PATENT DOCUMENTS

| | | | |
|---|---|---|---|
| 4,299,454 | 11/1981 | Betensky | 359/687 |
| 4,462,664 | 7/1984 | Moskovich | 359/690 |
| 4,494,828 | 1/1985 | Masumoto et al. | 359/690 |
| 4,582,399 | 4/1986 | Mihara | 359/687 X |
| 4,653,874 | 3/1987 | Takahashi et al. | 359/690 |
| 5,061,053 | 10/1991 | Hirakawa | 359/690 |

FOREIGN PATENT DOCUMENTS

63-70217  3/1988  Japan .

Primary Examiner—Edward K. Look
Assistant Examiner—Michael S. Lee
Attorney, Agent, or Firm—Cushman, Darby & Cushman

[57] ABSTRACT

The present invention relates to a zoom lens system which is invariable in terms of the total length during zooming, has a field angle of 50° or more and a coverage from the wide angle to quasi-telephoto region, and is suitable for use with a lens shutter type camera having a waterproof function. This zoom lens system comprises a first lens unit G1 having a positive refracting power, a second lens unit G2 having a negative refracting power and a third lens unit G3 having a positive refracting power. During zooming, the first lens unit remains fixed, while the second and third lens units are moved such that the second lens unit is larger than the third lens unit in terms of the maximum amount of movement, whereby zooming is carried out. The third lens unit is constructed from a front sub-unit G3F having a positive refracting power and a rear sub-unit G3R having a negative refracting power, said rear sub-unit including at least one negative meniscus lens convex on the image surface side.

18 Claims, 7 Drawing Sheets

SMALL THREE-UNIT ZOOM LENS

BACKGROUND OF THE INVENTION

The present invention relates generally to a zoom lens system having a field angle of 50° or more at the wide angle end and a coverage from the wide angle to quasi-telephoto region and lends itself well fit for a lens shutter type of still cameras and, more particularly, to a compact zoom lens suitable for use with a camera having a waterproof function in addition to the characteristic mentioned above.

Recently, a number of compact zoom lens systems have been proposed for a lens shutter type of camera lenses which have primarily been provided in the form of zoom lens systems.

For instance, JP-Kokai-56-128911 or JP-Kokai-57-201213 discloses a zoom lens system which comprises two, say, positive and negative, lens units in order from the object side and in which the respective lens units are moved to the image surface side for zooming from the wide angle to telephoto end.

According to JP-Kokai-63-153511 or JP-Kokai-1-252916, on the other hand, a zoom lens system comprising three, say, positive, positive and negative, lens units in order from the object side is proposed. In this zoom lens system, the respective lens units are designed to be moved from the image surface to object side for zooming from the wide angle to telephoto end.

However, the zoom lens systems referred to above are all increased in terms of the total length (i.e., the distance from the first surface of the lens to the film surface), while zooming is carried out from the wide angle to telephoto end by the movement of the first lens unit; in other words, their mechanisms are imperatively complicated so as to incorporate them in waterproof cameras, giving rise to increases in the cost and size of such cameras. Thus, they are unsuitable for use with waterproof cameras.

Among zoom lens systems the total lengths of which are kept invariable during zooming, there is a certain type of zoom lens system which comprises four, say, positive, negative, positive and positive, or alternatively positive, negative, negative and positive, lens units, and is designed to perform zooming by moving the second and third lens units on the optical axis which serve as a variator and a compensator, respectively, as well-known for a long time in the art.

However, this type of zoom lens system is likely to give rise to distortion with an increase in the lens diameter of the first unit, because the first unit is a positive lens so that the entrance pupil is spaced away from the first unit. Therefore, some difficulty is involved in reducing the focal length at the wide angle end, thereby making the field angle wide.

Incidentally, JP-Kokai-56-48607 refers to a zoom lens system comprising four, say, positive, negative, negative and positive, lens units and designed such that the focal length at the wide angle end is reduced to 35 mm. However, this type of zoom lens is again unsuitable for use with a lens shutter camera, because of using many lenses and being increased in terms of the total length and lens diameter as well.

In addition, JP-Kokai-63-70217 comes up with a zoom lens system for a lens shutter camera, in which the first lens unit remains fixed. Problems with this zoom lens system, however, are that its field angle is less than 50° and its zoom ratio is as low as about 1.5.

SUMMARY OF THE INVENTION

With such problems in mind, an object of this invention is to provide a zoom lens system which remains invariable in terms of the total length during zooming from the wide angle to telephoto end and which has a field angle of 50° or more at the wide angle end and a coverage from the wide angle to quasi-telephoto end and is suitable for use with a lens shutter type camera having a waterproof function.

According to this invention, the problems mentioned above are solved by the provision of a compact zoom lens system which comprises, in order from the object side, a first lens unit having a positive refracting power; a second lens unit having a negative refracting power; and a third lens unit consisting of a front sub-unit having a positive refracting power and a rear sub-unit including a negative meniscus lens convex on the image side and having a negative refracting power, said third lens unit having a positive refracting power as a whole;

said first lens unit remaining fixed, and said second and third lens units being moved along the optical axis such that said second lens unit is larger than said third lens unit in terms of the maximum amount of movement, whereby zooming is carried out.

Preferably, the following condition (1) should be satisfied:

$$0.15 < |(r_A - r_B)/(r_A + r_B)| < 0.45 \quad (1)$$

where:

$r_A$ is the radius of curvature on the object side of the negative meniscus lens of said rear sub-unit, and $r_B$ is the radius of curvature on the image surface side of the negative meniscus lens of said rear sub-unit.

Additionally, it is desired that the following conditions (2) and (3) be satisfied:

$$0.2 < |f_2/f_1| < 0.45 \quad (2),$$

and $$0.2 < f_3/F_T < 0.5 \quad (3)$$

where:

$f_1$ is the focal length of said first lens unit, $f_2$ is the focal length of said second lens unit, $f_3$ is the focal length of said third lens unit, and $F_T$ is the focal length of the entire system at the wide angle end.

In this connection, it is desired that said first lens unit include at least one negative lens and at least one positive lens and all the lenses that said first lens unit have be in the form of meniscus lenses convex on the object side.

Similarly, it is desired that said second lens unit include at least two negative lenses on the object side and at least one positive lens on the image side and all the negative lenses said second lens unit have be in the form of meniscus lenses convex on the object side.

It is noted that at least one aspherical lens may be incorporated in said first lens unit; at least one aspherical lens may be incorporated in said second lens unit; and at least one aspherical lens may be incorporated in said third lens unit.

It is also noted that a stop should preferably be located between said second and third lens units.

In the following description, why the arrangement mentioned above is adopted and how it acts will be explained.

In the case of a three, say, positive, negative and positive, unit lens zoom lens system, the third lens unit may be moved from the image surface to object side for zooming. In this arrangement, however, when the first lens unit remains fixed, the space between the first and second lens units at the telephoto end is so reduced that it is difficult to construct the entire system in the form of a telephoto type, resulting in an increase in the entire length of the lens system. For this reason, the zoom lens system of this invention is designed such that the zooming action is primarily born by the second lens unit and the third lens unit is moved primarily for keeping the image surface at a constant location, constructing the lens system in the form of a telephoto type at the telephoto end and thereby reducing the total length thereof. To this end, the maximum amount of movement of the second lens unit should be made larger than that of the third lens unit.

In order to be incorporated in a lens shutter type camera, the zoom lens system of this invention should preferably have a back focus reduced as much as possible, thereby reducing the total length of the lens system as much again. To achieve this, the third lens unit is constructed with the front sub-unit having a positive refracting power and the rear sub-unit having a negative refracting power, thereby reducing the back focus.

It is noted that at the wide angle end of this type lens system, off-axial rays pass through the first and second lens units at locations spaced away from the optical axis. In particular, since the refracting power of the second lens unit is larger than that of the first lens unit, the aberration resulting from the second lens unit is larger than that from the first lens unit, making a large astigmatism likely to occur in the plus direction and a large distortion likely to occur in the minus direction. In order to correct these astigmatism and distortion in a well-balanced state, a negative meniscus lens convex on the image surface side should be incorporated in the rear sub-unit of the third unit.

More preferable conditions will now be explained. Let $r_A$ and $r_B$ denote the radii of curvature of the above-mentioned negative meniscus lens on the object and image surface sides, respectively. Then, it is easy to widen the field angle at the wide angle end, if the following condition (1) is satisfied.

$$0.15 < |(r_A - r_B)/(r_A + r_B)| < 0.45 \qquad (1)$$

When the upper limit of the condition (1) mentioned above is exceeded, a large astigmatism occurs in the minus direction due to its over-correction, while a large distortion occurs in the minus direction due to its under-correction. When the lower limit is not reached, under-correction of the astigmatism and over-correction of the distortion occur.

It is desired that the transverse magnification, $\beta_3$, of the third lens unit be larger than $-1$ so as to reduce the back focus. If $\beta_3$ assumes a positive value, however, the refracting power of the second lens unit becomes so weak that difficulty is involved in gaining zoom ratios; this rather makes the lens system long. For this reason, it is desired that $-1 < \beta_3 < 0$ be satisfied.

By conforming to the following conditions (2) and (3), it is easy to achieve a lens system having an increased field angle at the wide angle end and a reduced entire length.

$$0.2 < |f_2/f_1| < 0.45 \qquad (2)$$

and $$0.2 < f_3/F_T < 0.5 \qquad (3)$$

where:
 $f_1$ is the focal length of said first lens unit,
 $f_2$ is the focal length of said second lens unit,
 $f_3$ is the focal length of said third lens unit, and
 $F_T$ is the focal length of the entire system at the wide angle end.

The condition (2) mentioned above is laid down for $f_1$ and $f_2$ so as to keep them in a well-balanced state. When the lower limit of Condition (2) is not reached, $f_2$ becomes too short with respect to $f_1$. This in turn causes an increase in the off-axial aberration resulting from the second lens unit at the wide angle end, making it difficult to achieve wide angle configuration in view of performance. Otherwise, $f_1$ becomes too long, making the space between the first and second lens units long and thereby giving rise to an increase in the total length of the lens system. When the upper limit is exceeded, on the other hand, $f_2$ becomes too long with respect to $f_2$, not only rendering it difficult to achieve zoom ratios but also making it difficult to secure any desired space between the first and second lens units at the wide angle end; in other words, it is difficult to widen the field angle.

When the upper limit of Condition (3) is exceeded, $f_3$ becomes too long, resulting in an increase in the back focus and thereby making it difficult to reduce the entire length of the lens system. When the lower limit is not reached, on the other hand, the back focus may be reduced, but the spherical aberration resulting from the third lens unit is so increased that difficulty is involved in improving the performance of the lens system.

Preferably, at least one negative lens and at least one positive lens are incorporated in the first lens unit and the lenses of the first lens unit are all formed of meniscus lenses convex on the object side. This is because the astigmatism and distortion resulting from the first lens unit are so reduced that the field angle at the wide angle side can be widened.

Preferably, the second lens unit has at least two negative lenses located on the object side and at least one positive lens located on the image surface side. This is because the principal plane of the second lens unit is so close to the object side that it is easy to secure any desired space between the first and second lens units at the wide angle end and thereby achieve wide angle configuration. By constructing all the negative lenses of the second lens unit with meniscus lenses convex on the object side, it is also possible to suppress the occurrence of astigmatism and distortion.

In addition, the incorporation of an aspherical lens in the third lens unit is effective for improving the performance of the lens system and reducing the total length of the lens system, because the spherical aberration resulting from the third lens unit can be easily compensated for.

Preferably, the stop is located between the second and third lens units with a view to achieving well-balanced off-axial aberrations. This stop may be designed to be moved together with the third lens unit during zooming, or moved independently or fixed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
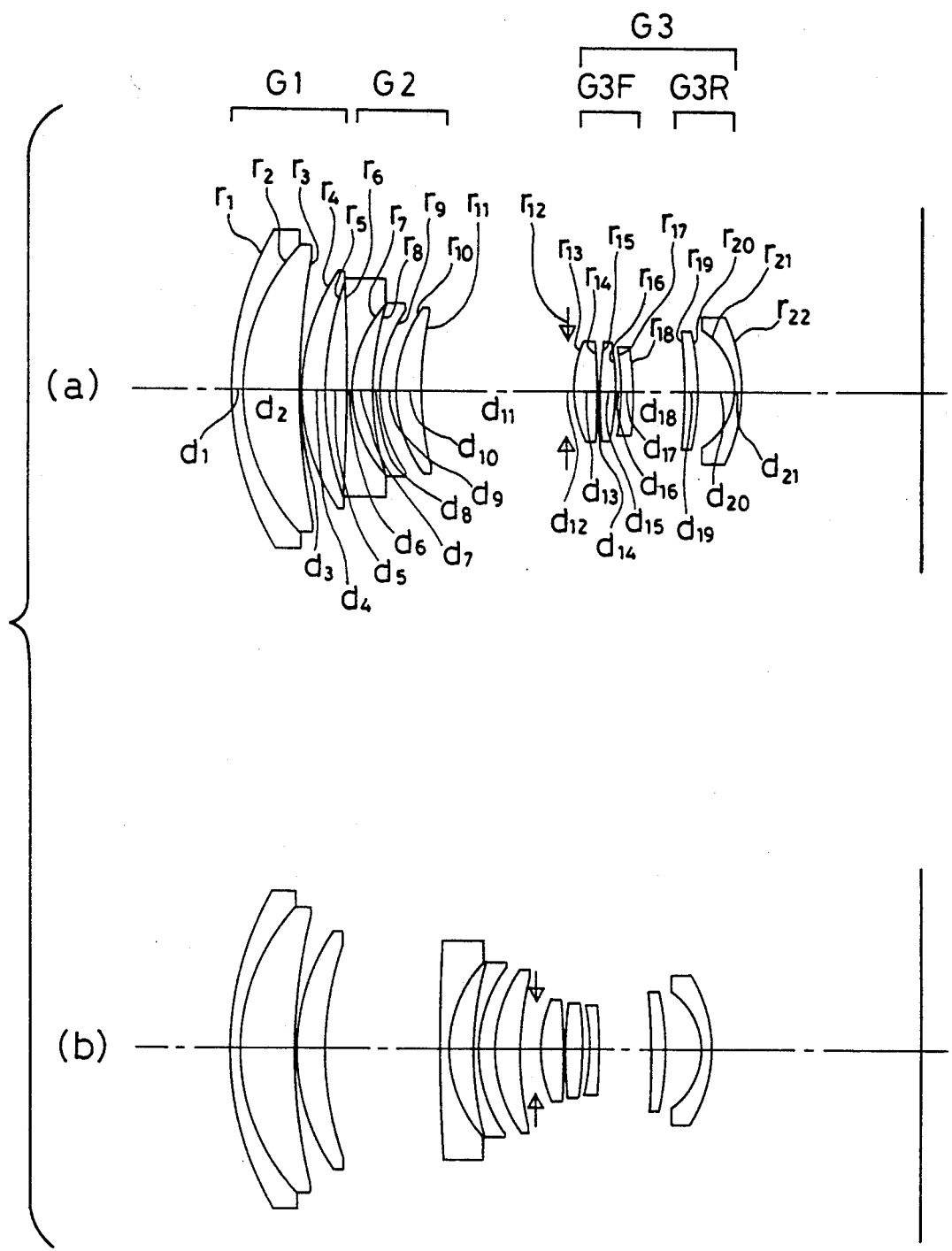
FIG. 1 represents in section the lens arrangement of the zoom lens system according to Example 1 of this invention at the (a) wide angle and (b) telephoto ends.
Figure 2:
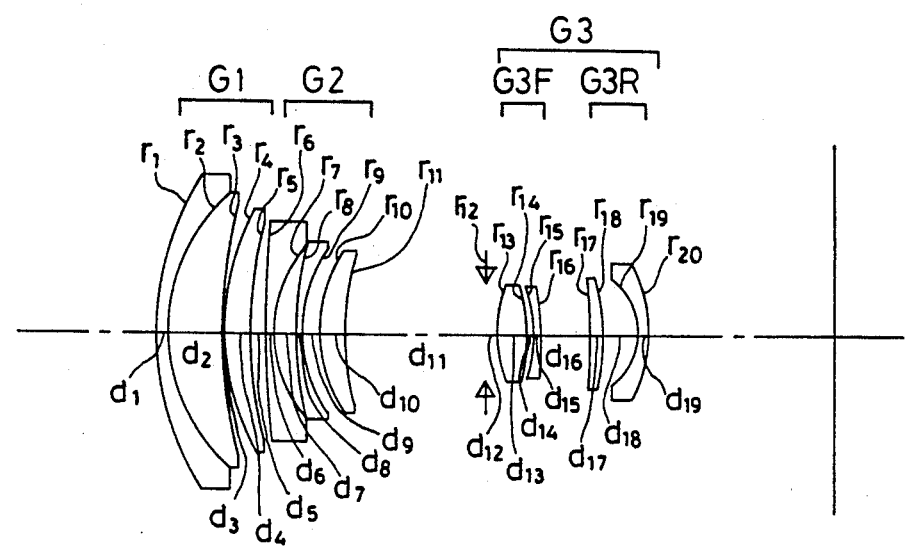
FIG. 2 represents in section the lens arrangement of Example 2 at the wide angle end.
Figure 3:
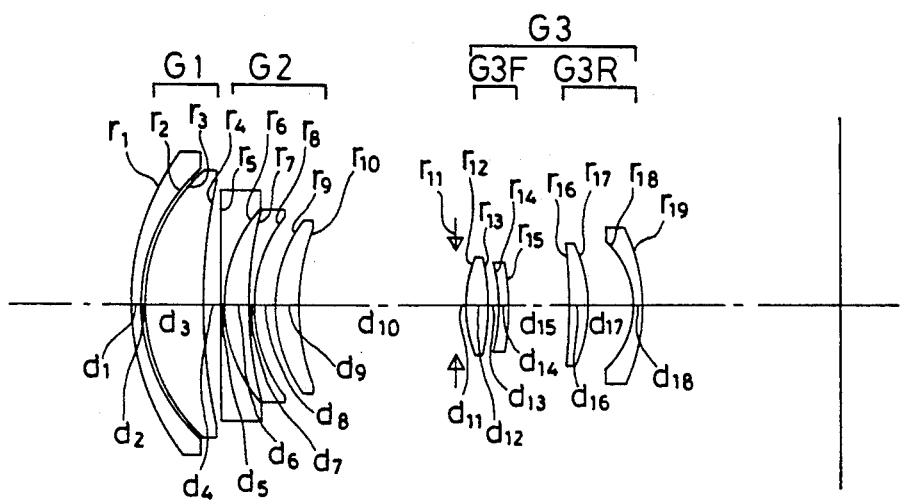
FIG. 3 represents in section the lens arrangement of Example 3 at the wide angle end.
Figure 4:
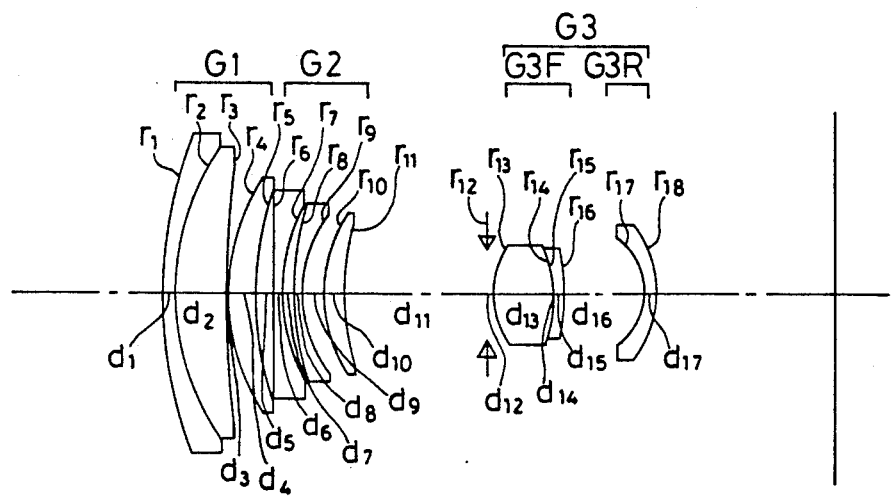
FIG. 4 represents in section the lens arrangement of Example f at the wide angle end.
Figure 5:
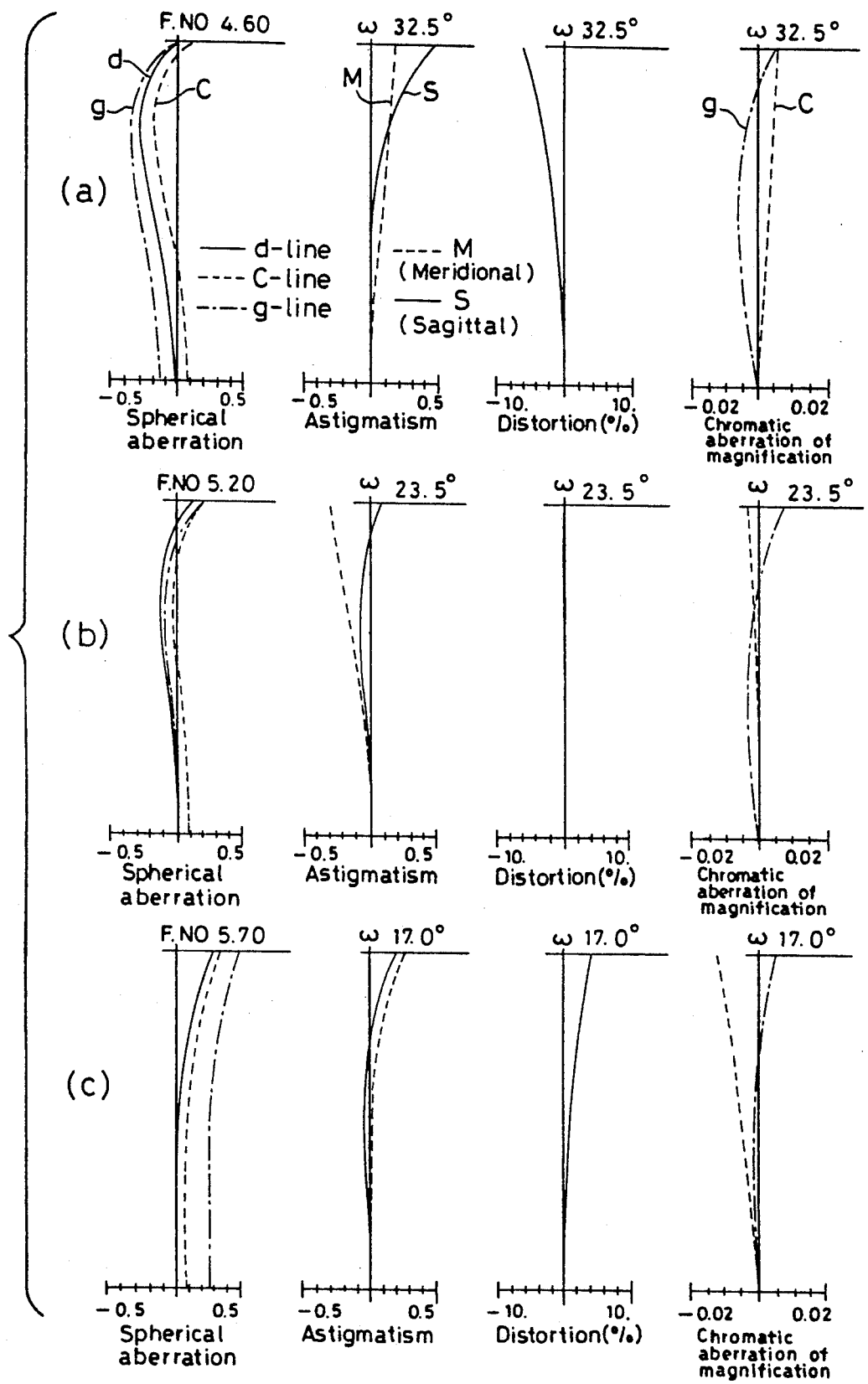
FIG. 5 is aberration diagrams showing the spherical aberration, astigmatism, distortion and chromatic aberration of magnification of Example 1 at the (a) wide angle end, (b) standard state and (c) telephoto end.
Figure 6:
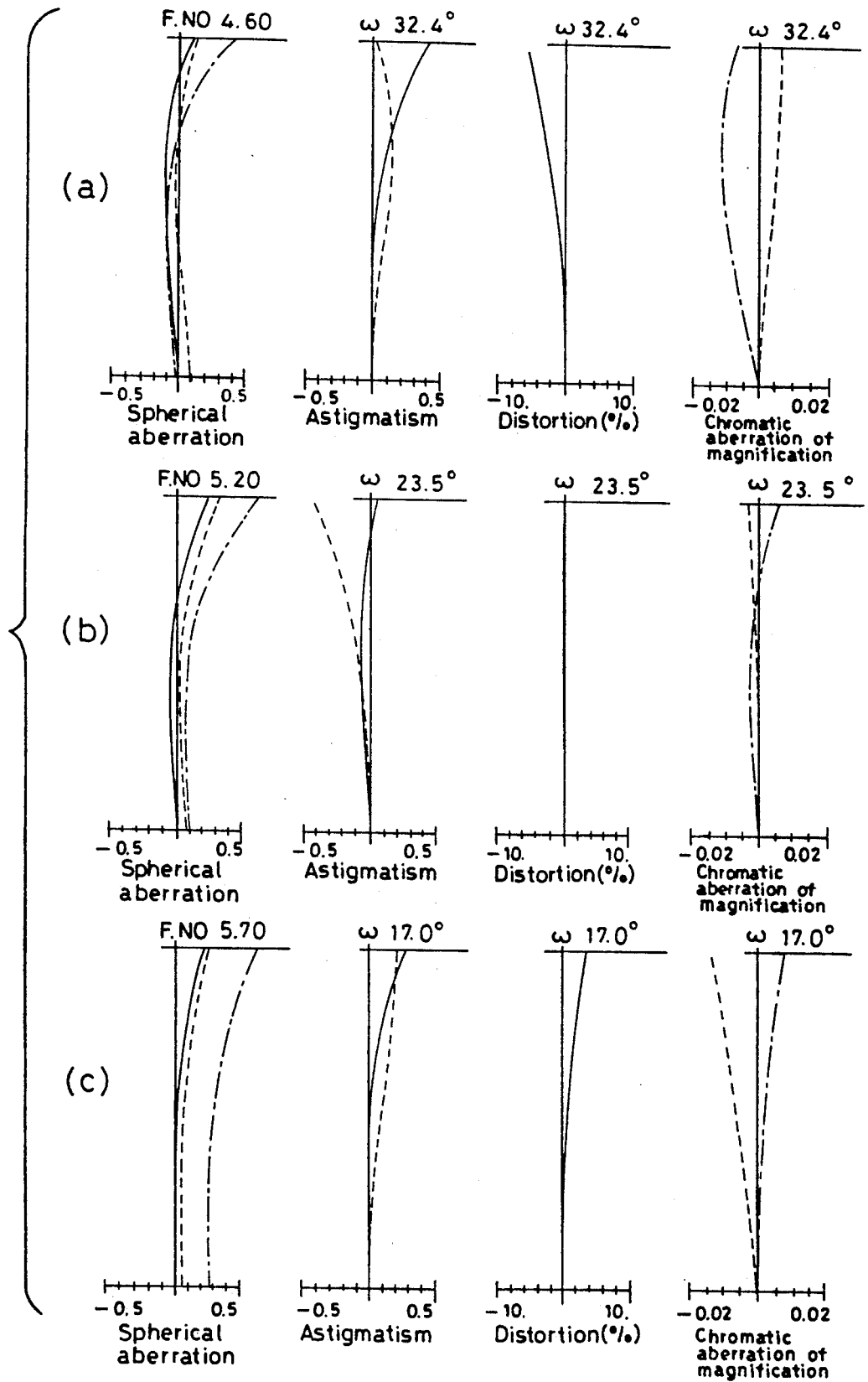
FIG. 6 is similar aberration diagrams of Example 2 as shown in FIG. 5.
Figure 7:
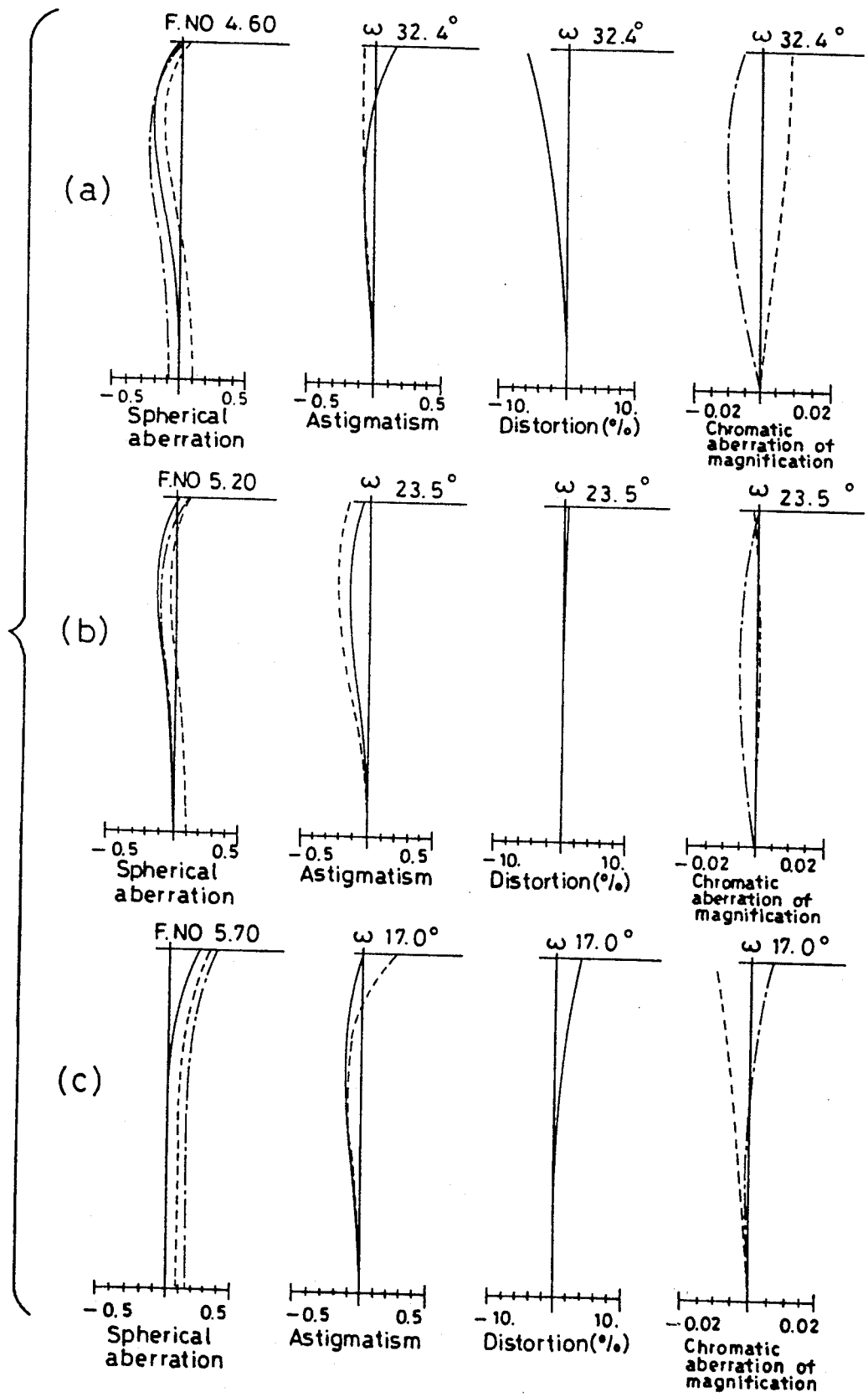
FIG. 7 is similar aberration diagrams of Example 3 as shown in FIG. 5.
Figure 8:
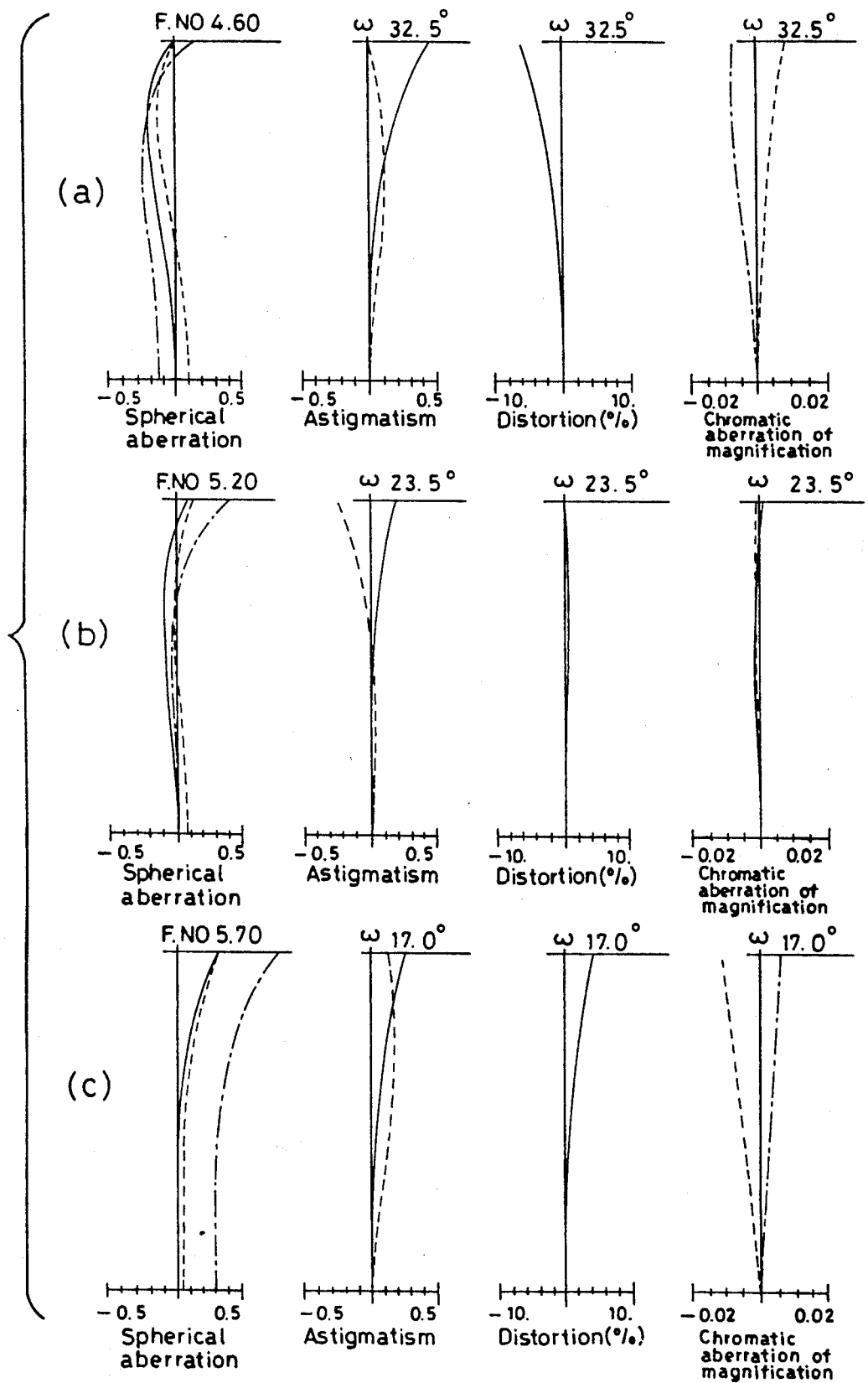
FIG. 8 is similar aberration diagrams of Example 4 as shown in FIG. 5.
Figure 9:
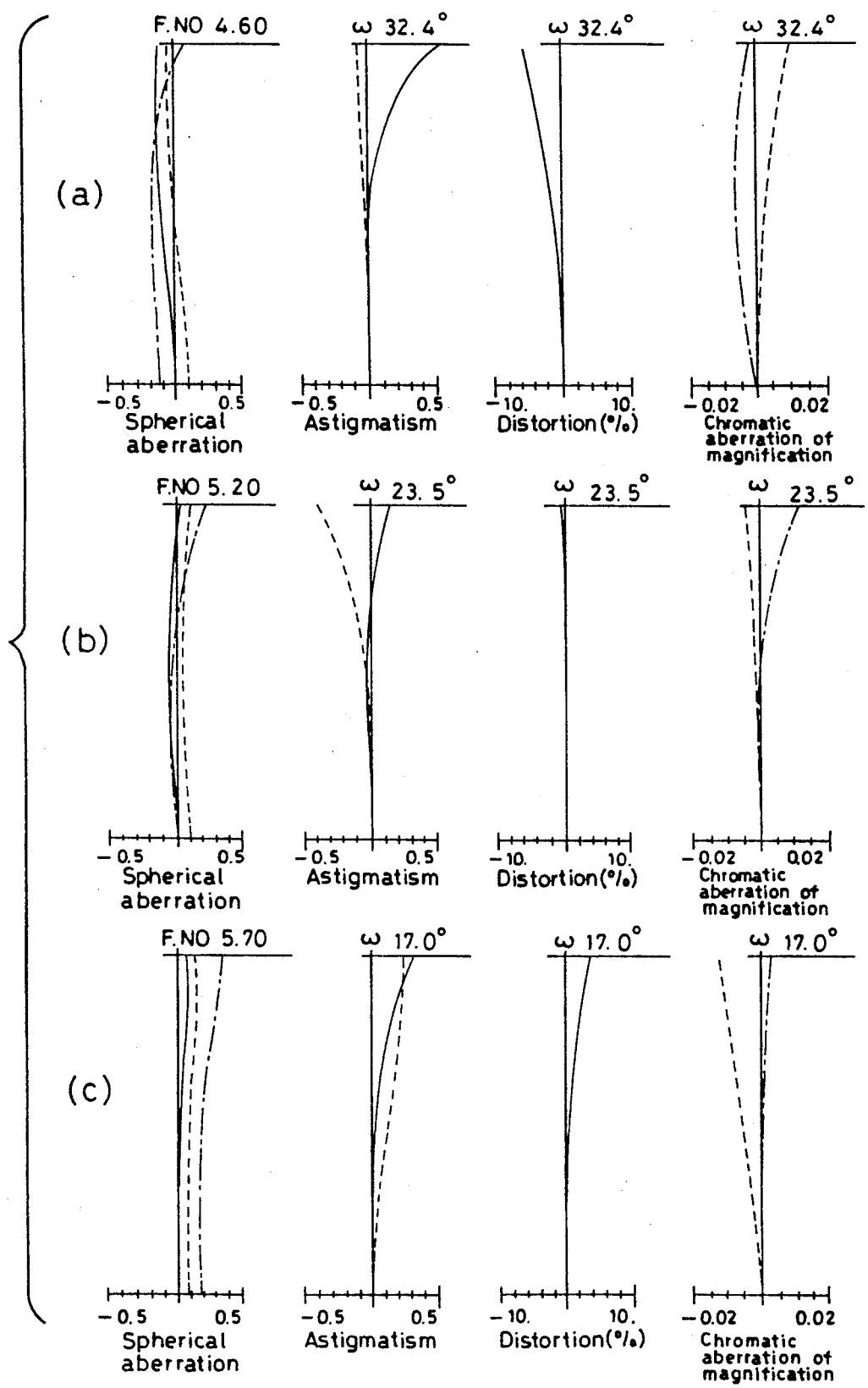
FIG. 9 is similar aberration diagrams of Example 5 as shown in FIG. 5.

In the following description, reference will be made to Examples 1-5 of the compact zoom lens system according to this invention, the lens data of which will be given later. The sections of the lens arrangement of Ex. 1 at the (a) wide angle and (b) telephoto ends are shown in FIG. 1, while the sections of the lens arrangements of Exs. 2-4 are shown in FIGS. 2-4. Note that the sections of the lens arrangement of Ex. 5, because of being almost similar to those of Ex. 2, are not shown.

In Example 1, 2, 4 or 5 the first lens unit G1 comprises, in order from the object side, a cemented lens convex on the object side, obtained by cementing negative and positive meniscus lenses together, and a positive meniscus lens convex on the object side, three lenses in all, and in Example 3 the first lens unit G1 comprises negative and positive meniscus lenses convex on the object side, two lenses in all. In each example the second lens unit G2 comprises, in order from the object side, two negative meniscus lenses convex on the object side and a positive meniscus lens convex on the object side, three lenses in all. Referring to the front sub-unit G3F of the third lens unit G3 in Example 1, it comprises, in order from the object side, a positive meniscus lens convex on the object side, a double-convex positive lens and a negative meniscus lens convex on the image surface side, three lenses in all. In Example 1, 3, 4 or 5 it comprises, in order from the object side, a double-convex positive lens and a negative meniscus lens convex on the image surface side, two lenses in all. Referring to the rear sub-unit G3R of the third lens unit G3 in Example 1, 2, 3 or 5, it comprises, in order from the object side, a positive meniscus lens convex on the image surface side and a negative meniscus lens convex on the image surface side, two lenses in all. In Example 4 it comprises one negative meniscus lens convex on the image side surface.

Accordingly, the zoom lens system according to Ex. 1 comprises 11 lenses in all; that of Ex. 2 or 5 ten lenses in all; and that of Ex. 3 or 4 nine lenses in all.

Aspherical surfaces are used in Examples 2, 4 and 5; more specifically, in Ex. 2 or 5 one aspherical surface is applied to the surface of the third lens unit G3 proximate to the object side, and in Ex. 4 one additional aspherical surface is applied to the surface of the rear sub-unit G3R of the third lens unit G3 on the object side, two in all.

Referring to the stop in Example 1, 2, 3 or 4, it is integrally located on the object side of the third lens unit G3. In Ex. 5 it is interposed between the second and third lens units G2 and G3, while it remains fixed during zooming.

It is noted that the zoom lens system of Ex. 3 can be reduced in the number of the lenses used without recourse to any aspherical surface, but is longer than the rest in terms of the total length.

Symbols used in the lens data of Examples 1-5 but not referred to hereinbefore mean:

$F_{NO}$: F-number $\omega$: half-field angle $f_B$: back focus $r_1, r_2, \ldots$ the radii of curvature of the respective lens surfaces $d_1, d_2, \ldots$ the space between adjacent lens surfaces $n_{d1}, n_{d2}, \ldots$ the d-line refractive indices of the respective lenses $\nu_1, \nu_2, \ldots$ the Abbe's numbers of the respective lenses.

In connection with aspherical configuration, it is noted that let x denote the optical axis direction and y stand for the direction normal to the optical axis, then it is represented by the following formula:

$$x = y^2 / \{r + (r^2 - y^2)^{\frac{1}{2}}\} + A_4 y^4 + A_6 y^6 + A_8 y^8$$

where r is the radius of curvature on the optical axis, and $A_4$, $A_6$ and $A_8$ each stand for the aspherical coefficient.

Example 1
$f = 36.27 \sim 49.65 \sim 68.03$
$F_{NO} = 4.60 \sim 5.20 \sim 5.70$
$\omega = 32.5 \sim 23.5 \sim 17.0°$
$f_B = 21.04 \sim 23.65 \sim 24.94$

| | | | |
|---|---|---|---|
| $r_1 = 36.916$ | $d_1 = 1.50$ | $n_{d1} = 1.80518$ | $\nu_{d1} = 25.43$ |
| $r_2 = 23.954$ | $d_2 = 6.50$ | $n_{d2} = 1.56384$ | $\nu_{d2} = 60.69$ |
| $r_3 = 75.072$ | $d_3 = 0.15$ | | |
| $r_4 = 23.851$ | $d_4 = 3.09$ | $n_{d3} = 1.57250$ | $\nu_{d3} = 57.76$ |
| $r_5 = 39.138$ | $d_5 = $ (Variable) | | |
| $r_6 = 320.730$ | $d_6 = 1.22$ | $n_{d4} = 1.72916$ | $\nu_{d4} = 54.68$ |
| $r_7 = 15.548$ | $d_7 = 2.48$ | | |
| $r_8 = 35.614$ | $d_8 = 1.04$ | $n_{d5} = 1.77250$ | $\nu_{d5} = 49.66$ |
| $r_9 = 17.147$ | $d_9 = 1.80$ | | |
| $r_{10} = 17.181$ | $d_{10} = 2.99$ | $n_{d6} = 1.72825$ | $\nu_{d6} = 28.46$ |
| $r_{11} = 41.151$ | $d_{11} = $ (Variable) | | |
| $r_{12} = \infty$ (Stop) | $d_{12} = 1.00$ | | |
| $r_{13} = 12.391$ | $d_{13} = 2.73$ | $n_{d7} = 1.51633$ | $\nu_{d7} = 64.15$ |
| $r_{14} = 486.828$ | $d_{14} = 0.21$ | | |
| $r_{15} = 44.548$ | $d_{15} = 2.26$ | $n_{d8} = 1.51633$ | $\nu_{d8} = 64.15$ |
| $r_{16} = -23.044$ | $d_{16} = 0.89$ | | |
| $r_{17} = -16.082$ | $d_{17} = 1.00$ | $n_{d9} = 1.78470$ | $\nu_{d9} = 26.30$ |
| $r_{18} = -43.818$ | $d_{18} = 6.15$ | | |
| $r_{19} = 155.375$ | $d_{19} = 1.97$ | $n_{d10} = 1.54814$ | $\nu_{d10} = 45.78$ |
| $r_{20} = -25.088$ | $d_{20} = 4.16$ | | |
| $r_{21} = -8.256$ | $d_{21} = 1.17$ | $n_{d11} = 1.77250$ | $\nu_{d11} = 49.66$ |
| $r_{22} = -16.832$ | | | |

-continued

| | Zooming Spaces | | |
|---|---|---|---|
| f | 36.27 | 49.65 | 68.03 |
| $d_5$ | 1.97 | 7.28 | 13.62 |
| $d_{11}$ | 16.60 | 8.96 | 1.20 |
| | $|(r_A - r_B)/(r_A + r_B)| = 0.342$ | | |
| | $|f_2/f_1| = 0.354$ | | |
| | $f_3/F_T = 0.344$ | | |
| f | 36.27 | 49.65 | 68.03 |
| $\beta_3$ | −0.72 | −0.83 | −0.89 |

Example 2
$f = 36.29 \sim 49.70 \sim 68.12$
$F_{NO} = 4.60 \sim 5.20 \sim 5.70$
$\omega = 32.4 \sim 23.5 \sim 17.0°$
$f_B = 22.55 \sim 25.13 \sim 24.82$

| | | | |
|---|---|---|---|
| $r_1 = 33.028$ | $d_1 = 1.50$ | $n_{d1} = 1.80518$ | $\nu_{d1} = 25.43$ |
| $r_2 = 22.948$ | $d_2 = 6.26$ | $n_{d2} = 1.56384$ | $\nu_{d2} = 60.69$ |
| $r_3 = 57.153$ | $d_3 = 0.15$ | | |
| $r_4 = 26.911$ | $d_4 = 3.12$ | $n_{d3} = 1.57250$ | $\nu_{d3} = 57.76$ |
| $r_5 = 47.730$ | $d_5 =$ (Variable) | | |
| $r_6 = 237.019$ | $d_6 = 1.22$ | $n_{d4} = 1.72916$ | $\nu_{d4} = 54.68$ |
| $r_7 = 15.837$ | $d_7 = 2.57$ | | |
| $r_8 = 36.328$ | $d_8 = 1.04$ | $n_{d5} = 1.77250$ | $\nu_{d5} = 49.66$ |
| $r_9 = 17.272$ | $d_9 = 2.01$ | | |
| $r_{10} = 17.276$ | $d_{10} = 3.04$ | $n_{d6} = 1.71736$ | $\nu_{d6} = 29.51$ |
| $r_{11} = 40.541$ | $d_{11} =$ (Variable) | | |
| $r_{12} = \infty$ (Stop) | $d_{12} = 1.00$ | | |
| $r_{13} = 11.132$ (Aspheric) | $d_{13} = 4.22$ | $n_{d7} = 1.51633$ | $\nu_{d7} = 64.15$ |
| $r_{14} = -17.786$ | $d_{14} = 0.45$ | | |
| $r_{15} = -14.786$ | $d_{15} = 1.00$ | $n_{d8} = 1.78472$ | $\nu_{d8} = 25.68$ |
| $r_{16} = -31.111$ | $d_{16} = 5.96$ | | |
| $r_{17} = -78.894$ | $d_{17} = 1.86$ | $n_{d9} = 1.54814$ | $\nu_{d9} = 45.78$ |
| $r_{18} = -21.667$ | $d_{18} = 4.03$ | | |
| $r_{19} = -7.697$ | $d_{19} = 1.17$ | $n_{d10} = 1.77250$ | $\nu_{d10} = 49.66$ |
| $r_{20} = -16.218$ | | | |

| | Zooming Spaces | | |
|---|---|---|---|
| f | 36.29 | 49.70 | 68.12 |
| $d_5$ | 1.80 | 7.28 | 15.51 |
| $d_{11}$ | 17.05 | 9.18 | 1.20 |

Aspherical Coefficients
13th surface
$A_4 = -1.5935 \times 10^{-5}$
$A_6 = -2.8987 \times 10^{-7}$
$A_8 = 6.1279 \times 10^{-9}$
$|(r_A - r_B)/(r_A + r_B)| = 0.356$
$|f_2/f_1| = 0.354$
$f_3/F_T = 0.350$

| f | 36.29 | 49.70 | 68.12 |
|---|---|---|---|
| $\beta_3$ | −0.71 | −0.82 | −0.80 |

Example 3
$f = 36.20 \sim 49.58 \sim 67.95$
$F_{NO} = 4.60 \sim 5.20 \sim 5.70$
$2\omega = 32.4 \sim 23.5 \sim 17.0°$
$f_B = 23.66 \sim 26.49 \sim 29.00$

| | | | |
|---|---|---|---|
| $r_1 = 28.839$ | $d_1 = 1.50$ | $n_{d1} = 1.80518$ | $\nu_{d1} = 25.43$ |
| $r_2 = 20.726$ | $d_2 = 0.30$ | | |
| $r_3 = 21.241$ | $d_3 = 7.36$ | $n_{d2} = 1.64250$ | $\nu_{d2} = 58.37$ |
| $r_4 = 89.788$ | $d_4 =$ (variable) | | |
| $r_5 = 313.943$ | $d_5 = 1.20$ | $n_{d3} = 1.72916$ | $\nu_{d3} = 54.68$ |
| $r_6 = 18.196$ | $d_6 = 2.11$ | | |
| $r_7 = 35.080$ | $d_7 = 1.04$ | $n_{d4} = 1.77250$ | $\nu_{d4} = 49.66$ |
| $r_8 = 17.681$ | $d_8 = 2.63$ | | |
| $r_9 = 18.483$ | $d_9 = 2.76$ | $n_{d5} = 1.76182$ | $\nu_{d5} = 26.52$ |
| $r_{10} = 35.364$ | $d_{10} =$ (Variable) | | |
| $r_{11} = \infty$ (Stop) | $d_{11} = 1.00$ | | |
| $r_{12} = 15.276$ | $d_{12} = 3.35$ | $n_{d6} = 1.56873$ | $\nu_{d6} = 63.16$ |
| $r_{13} = -23.560$ | $d_{13} = 1.06$ | | |
| $r_{14} = -16.914$ | $d_{14} = 1.00$ | $n_{d7} = 1.80518$ | $\nu_{d7} = 25.43$ |
| $r_{15} = -37.483$ | $d_{15} = 7.38$ | | |
| $r_{16} = -104.824$ | $d_{16} = 2.42$ | $n_{d8} = 1.61484$ | $\nu_{d8} = 51.17$ |
| $r_{17} = -20.923$ | $d_{17} = 5.70$ | | |
| $r_{18} = -9.639$ | $d_{18} = 1.17$ | $n_{d9} = 1.77250$ | $\nu_{d9} = 49.66$ |
| $r_{19} = -18.946$ | | | |

| | Zooming Spaces | | |
|---|---|---|---|
| f | 36.20 | 49.58 | 67.95 |
| $d_4$ | 1.80 | 7.67 | 13.54 |
| $d_{10}$ | 18.60 | 9.92 | 1.39 |

$|(r_A - r_B)/(r_A + r_B)| = 0.326$
$|f_2/f_1| = 0.356$
$f_3/F_T = 0.383$

| f | 36.20 | 49.58 | 67.95 |
|---|---|---|---|
| $\beta_3$ | −0.68 | −0.79 | −0.89 |

Example 4
$f = 36.22 \sim 49.61 \sim 67.98$
$F_{NO} = 4.60 \sim 5.20 \sim 5.70$
$\omega = 32.5 \sim 23.5 \sim 17.0°$
$f_B = 21.40 \sim 24.18 \sim 26.56$

| | | | |
|---|---|---|---|
| $r_1 = 48.641$ | $d_1 = 1.50$ | $n_{d1} = 1.80518$ | $\nu_{d1} = 25.43$ |
| $r_2 = 27.491$ | $d_2 = 6.34$ | $n_{d2} = 1.56883$ | $\nu_{d2} = 56.34$ |
| $r_3 = 121.681$ | $d_3 = 0.15$ | | |
| $r_4 = 23.394$ | $d_4 = 3.59$ | $n_{d3} = 1.53996$ | $\nu_{d3} = 59.57$ |
| $r_5 = 43.247$ | $d_5 =$ (Variable) | | |
| $r_6 = 480.607$ | $d_6 = 1.20$ | $n_{d4} = 1.72916$ | $\nu_{d4} = 54.68$ |
| $r_7 = 19.456$ | $d_7 = 1.68$ | | |
| $r_8 = 37.242$ | $d_8 = 1.04$ | $n_{d5} = 1.77250$ | $\nu_{d5} = 49.66$ |
| $r_9 = 15.902$ | $d_9 = 2.70$ | | |
| $r_{10} = 18.063$ | $d_{10} = 2.61$ | $n_{d6} = 1.76182$ | $\nu_{d6} = 26.52$ |
| $r_{11} = 35.918$ | $d_{11} =$ (Variable) | | |
| $r_{12} = \infty$ (Stop) | $d_{12} = 1.00$ | | |
| $r_{13} = 10.979$ (Aspheric) | $d_{13} = 7.52$ | $n_{d7} = 1.51633$ | $\nu_{d7} = 64.15$ |
| $r_{14} = -14.332$ | $d_{14} = 0.20$ | | |
| $r_{15} = -12.439$ | $d_{15} = 1.00$ | $n_{d8} = 1.78470$ | $\nu_{d8} = 26.22$ |
| $r_{16} = -23.180$ | $d_{16} = 10.20$ | | |
| $r_{17} = -7.236$ (Aspheric) | $d_{17} = 1.17$ | $n_{d9} = 1.77250$ | $\nu_{d9} = 49.66$ |
| $r_{18} = -11.779$ | | | |

| | Zooming Spaces | | |
|---|---|---|---|
| f | 36.22 | 49.61 | 67.98 |
| $d_5$ | 1.88 | 7.06 | 12.40 |
| $d_{11}$ | 16.73 | 8.95 | 1.20 |

Aspherical Coefficients
13th surface
$A_4 = -2.0475 \times 10^{-5}$
$A_6 = -1.7753 \times 10^{-7}$
$A_8 = 5.8664 \times 10^{-9}$
17th surface
$A_4 = -3.8642 \times 10^{-6}$
$|(r_A - r_B)/(r_A + r_B)| = 0.239$
$|f_2/f_1| = 0.360$
$f_3/F_T = 0.347$

| f | 36.22 | 49.61 | 67.98 |
|---|---|---|---|
| $\beta_3$ | −0.72 | −0.84 | −0.94 |

Example 5
$f = 36.27 \sim 49.64 \sim 68.09$
$F_{NO} = 4.60 \sim 5.20 \sim 5.70$
$\omega = 32.4 \sim 23.5 \sim 17.0°$
$f_B = 22.28 \sim 24.63 \sim 24.62$

| | | | |
|---|---|---|---|
| $r_1 = 32.635$ | $d_1 = 1.50$ | $n_{d1} = 1.80518$ | $\nu_{d1} = 25.43$ |
| $r_2 = 22.604$ | $d_2 = 6.28$ | $n_{d2} = 1.56384$ | $\nu_{d2} = 60.69$ |
| $r_3 = 57.485$ | $d_3 = 0.15$ | | |
| $r_4 = 26.769$ | $d_4 = 3.13$ | $n_{d3} = 1.57250$ | $\nu_{d3} = 57.76$ |
| $r_5 = 45.930$ | $d_5 =$ (Variable) | | |
| $r_6 = 229.800$ | $d_6 = 1.22$ | $n_{d4} = 1.72916$ | $\nu_{d4} = 54.68$ |
| $r_7 = 15.860$ | $d_7 = 2.57$ | | |
| $r_8 = 36.565$ | $d_8 = 1.04$ | $n_{d5} = 1.77250$ | $\nu_{d5} = 49.66$ |
| $r_9 = 17.402$ | $d_9 = 2.01$ | | |
| $r_{10} = 17.355$ | $d_{10} = 3.04$ | $n_{d6} = 1.72825$ | $\nu_{d6} = 28.46$ |
| $r_{11} = 39.915$ | $d_{11} =$ (Variable) | | |
| $r_{12} = \infty$ (Stop) | $d_{12} =$ (Variable) | | |
| $r_{13} = 11.096$ (Aspheric) | $d_{13} = 4.23$ | $n_{d7} = 1.51633$ | $\nu_{d7} = 64.15$ |
| $r_{14} = -17.848$ | $d_{14} = 0.46$ | | |
| $r_{15} = -14.841$ | $d_{15} = 1.00$ | $n_{d8} = 1.78472$ | $\nu_{d8} = 25.68$ |
| $r_{16} = -30.563$ | $d_{16} = 5.98$ | | |
| $r_{17} = -69.613$ | $d_{17} = 1.87$ | $n_{d9} = 1.54814$ | $\nu_{d9} = 45.78$ |
| $r_{18} = -22.552$ | $d_{18} = 4.03$ | | |
| $r_{19} = -7.630$ | $d_{19} = 1.17$ | $n_{d10} = 1.77250$ | $\nu_{d10} = 49.66$ |
| $r_{20} = -15.576$ | | | |

| | Zooming Spaces | | |
|---|---|---|---|
| f | 36.27 | 49.64 | 68.09 |
| $d_5$ | 1.80 | 7.61 | 15.48 |
| $d_{11}$ | 14.84 | 9.34 | 1.20 |
| $d_{12}$ | 3.33 | 1.00 | 1.00 |

Aspherical Coefficients

-continued

| | 13th surface | |
|---|---|---|
| | $A_4 = -1.7903 \times 10^{-5}$ | |
| | $A_6 = -2.2687 \times 10^{-7}$ | |
| | $A_8 = 5.2715 \times 10^{-9}$ | |
| | $\lvert(r_A - r_B)/(r_A + r_B)\rvert = 0.342$ | |
| | $\lvert f_2/f_1 \rvert = 0.353$ | |
| | $f_3/F_T = 0.350$ | |
| f | 36.27 | 49.64 | 68.09 |
| $\beta_3$ | $-0.70$ | $-0.80$ | $-0.80$ |

The spherical aberrations, astigmatisms, distortions and chromatic aberrations of magnification of Examples 1-5 at the (a) wide angle ends, (b) standard states and (c) telephoto ends are shown in the aberration diagrams of FIGS. 5–9.

As explained above, the compact zoom lens system of this invention is suitable for a camera having a waterproof function because the first lens unit remains fixed during zooming, and has a field angle of 50° or more at the wide angle end and a coverage from the wide angle to quasi-telephoto region.

What is claimed is:

1. A three-unit zoom lens system which comprises, in order from the object side, only the following three lens units:

a first lens unit having a positive refractive power;
   a second lens unit having a negative refractive power, with a separation between said first and second lens units, said second lens unit being disposed on the image side of said first lens unit; and
   a third lens unit having a positive refractive power as a whole, with a separation between said second and third lens units, said third lens unit being disposed on the image side of said second lens unit, said third lens unit consisting of a front sub-unit having a positive refractive power and a rear sub-unit having a negative refracting power, with a separation between said front and rear sub-units, said rear sub-unit including a negative meniscus lens convex on the image side and having a negative refractive power, said third lens unit having a positive refractive power as a whole,
   said first lens unit remaining fixed, and
   said second and third lens units being moved along the optical axis such that a maximum amount of movement of said second lens unit is larger than a maximum amount of movement of said third lens unit, whereby zooming is carried out.

2. A three-unit zoom lens system as recited in claim 1, which further conforms to the following condition (1):

$$0.15 < \lvert(r_A - r_B)/(r_A + r_B)\rvert < 0.45 \tag{1}$$

where:
   $r_A$ is the radius of curvature on the object side of the negative meniscus lens of said rear sub-unit, and
   $r_B$ is the radius of curvature on the image surface side of the negative meniscus lens of said rear sub-unit.

3. A three-unit zoom lens system as recited in claim 1 or 2, which further conforms to the following conditions (2) and (3).

$$0.2 < \lvert f_2/f_1 \rvert < 0.45 \tag{2},$$

and $$0.2 < f_3/F_T < 0.5 \tag{3}$$

where:
   $f_1$ is the focal length of said first lens unit,
   $f_2$ is the focal length of said second lens unit,
   $f_3$ is the focal length of said third lens unit, and
   $F_T$ is the focal length of the entire system at the wide angle end.

4. A three-unit zoom lens system as recited in claim 1, wherein said first lens unit includes at least one negative lens and at least one positive lens.

5. A three-unit zoom lens system as recited in claim 1 or 4, wherein all the lenses said first lens unit has are in the form of meniscus lenses convex on the object side.

6. A three-unit zoom lens system as recited in claim 1, wherein said second lens unit includes at least two negative lenses on the object side, and at least one positive lens at a position closer to the image side than positions of said two negative lenses.

7. A three-unit zoom lens system as recited in claim 1 or 6, wherein all the negative lenses said second lens unit has are in the form of meniscus lenses convex on the object side.

8. A three-unit zoom lens system as recited in claim 1, wherein said first lens unit includes at least one aspherical lens.

9. A three-unit zoom lens system as recited in claim 1, wherein said second lens unit includes at least one aspherical lens.

10. A three-unit zoom lens system as recited in claim 1, wherein said third lens unit includes at least one aspherical lens.

11. A three-unit zoom lens system as recited in claim 1, which includes a stop between said second and third lens units.

12. A three-unit zoom lens system as recited in claim 1, which further conforms to the following condition (4):

$$-1 < \beta_3 < 0 \tag{4}$$

where:
   $\beta_3$ is the transverse magnification of said third lens unit.

13. A zoom lens system which comprises, in order from the object side,
   a first lens unit having a positive refractive power;
   a second lens unit having a negative refractive power; and
   a third lens unit consisting of a front sub-unit having a positive refractive power and a rear sub-unit including a negative meniscus lens convex on the image side and having a negative refractive power, said third lens unit having a positive refractive power as a whole;
   said first lens unit remaining fixed, and
   said second and third lens units being moved along the optical axis such that a maximum amount of movement of said second lens unit is larger than a maximum amount of movement of said third lens unit, whereby zooming is carried out;
   wherein all lenses in said first lens unit are in the form of meniscus lenses convex on the object side.

14. A zoom lens system which comprises, in order from the object side,
   a first lens unit having a positive refractive power;
   a second lens unit having a negative refractive power; and
   a third lens unit consisting of a front sub-unit having a positive refractive power and a rear sub-unit including a negative meniscus lens convex on the image side and having a negative refractive power, said third lens unit having a positive refractive power as a whole;

said first lens unit remaining fixed, and said second and third lens units being moved along the optical axis such that a maximum amount of movement of said second lens unit is larger than a maximum amount of movement of said third lens unit, whereby zooming is carried out;

wherein all negative lens units in said second lens unit are in the form of negative meniscus lenses convex on the object side.

15. A zoom lens system which comprises, in order from the object side, a first lens unit having a positive refractive power;

a second lens unit having a negative refractive power; and a third lens unit consisting of a front sub-unit having a positive refractive power and a rear sub-unit including a negative meniscus lens convex on the image side and having a negative refractive power, said third lens unit having a positive refractive power as a whole;

said first lens unit remaining fixed, and said second and third lens units being moved along the optical axis such that a maximum amount of movement of said second lens unit is larger than a maximum amount of movement of said third lens unit, whereby zooming is carried out;

wherein said first lens unit includes at least one aspherical lens.

16. A zoom lens system which comprises, in order from the object side, a first lens unit having a positive refractive power;

a second lens unit having a negative refractive power; and a third lens unit consisting of a front sub-unit having a positive refractive power and a rear sub-unit including a negative meniscus lens convex on the image side and having a negative refractive power, said third lens unit having a positive refractive power as a whole;

said first lens unit remaining fixed, and said second and third lens units being moved along the optical axis such that a maximum amount of movement of said second lens unit is larger than a maximum amount of movement of said third lens unit, whereby zooming is carried out;

wherein said second lens unit includes at least one aspherical lens.

17. A zoom lens system which comprises, in order from the object side, a first lens unit having a positive refractive power;

a second lens unit having a negative refractive power; and a third lens unit consisting of a front sub-unit having a positive refractive power and a rear sub-unit including a negative meniscus lens convex on the image side and having a negative refractive power, said third lens unit having a positive refractive power as a whole;

said first lens unit remaining fixed, and said second and third lens units being moved along the optical axis such that a maximum amount of movement of said second lens unit is larger than a maximum amount of movement of said third lens unit, whereby zooming is carried out;

wherein said third lens unit includes at least one aspherical lens.

18. A zoom lens system which comprises, in order from the object side, a first lens unit having a positive refractive power;

a second lens unit having a negative refractive power; and a third lens unit consisting of a front sub-unit having a positive refractive power and a rear sub-unit including a negative meniscus lens convex on the image side and having a negative refractive power, said third lens unit having a positive refractive power as a whole;

said first lens unit remaining fixed, and said second and third lens units being moved along the optical axis such that a maximum amount of movement of said second lens unit is larger than a maximum amount of movement of said third lens unit, whereby zooming is carried out;

wherein said zoom lens system satisfies the following condition (4):

$$-1 < \beta_3 < 0 \qquad (4)$$

where $\beta_3$ is the transverse magnification of said third lens unit.

* * * * *